Figure 1:
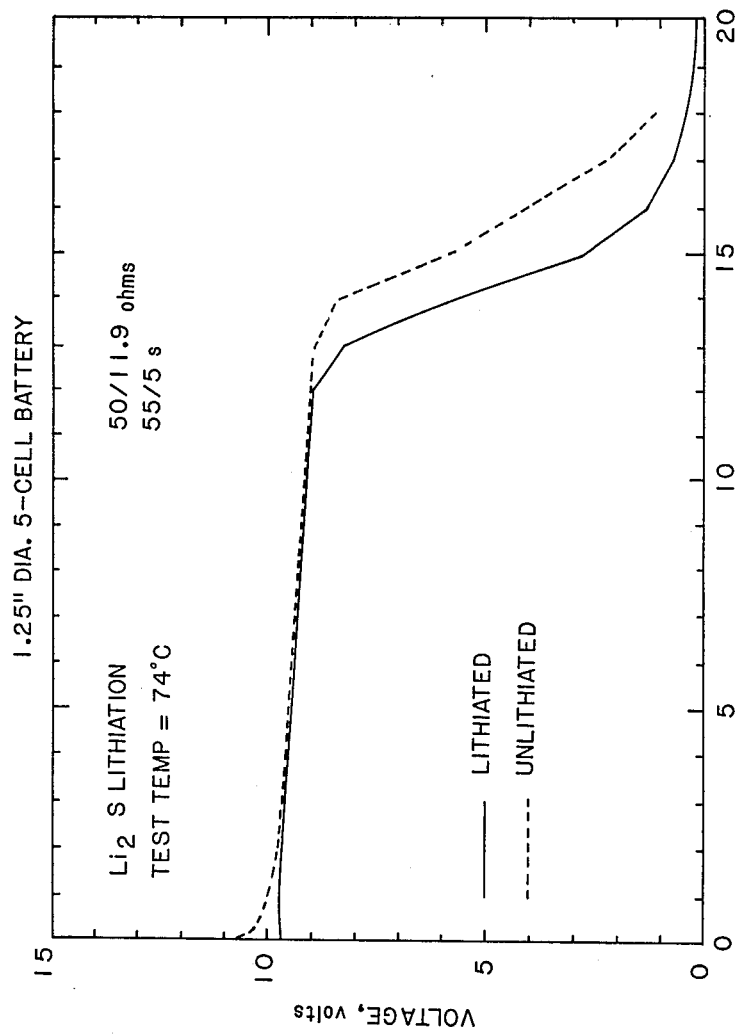

United States Patent [19]

Guidotti

[11] Patent Number: 4,731,307

[45] Date of Patent: Mar. 15, 1988

[54] METHODS FOR ACHIEVING THE EQUILIBRIUM NUMBER OF PHASES IN MIXTURES SUITABLE FOR USE IN BATTERY ELECTRODES, E.G., FOR LITHIATING FES$_2$

[75] Inventor: Ronald A. Guidotti, Albuquerque, N. Mex.

[73] Assignee: The United States of America as represented by the United States Department of Energy, Washington, D.C.

[21] Appl. No.: 872,728

[22] Filed: Jun. 10, 1986

[51] Int. Cl.$^4$ .................. H01M 6/36; C01B 17/00
[52] U.S. Cl. ................ 429/112; 429/221; 423/138; 423/179.5; 423/511
[58] Field of Search .............. 429/118, 221, 112; 423/138, 179.5, 511

[56] References Cited

U.S. PATENT DOCUMENTS 3,907,589  9/1975  Gay et al. ............. 429/221 X
4,006,034  2/1977  Shimotake et al. ..... 429/221 X
4,164,069  8/1977  Tomczuk ............. 423/138 X

OTHER PUBLICATIONS

Searcy et al, Sandia, 80-0423, Report 5/1980.
Baldwin, Sandia, 83-0863, Report 8/1984.
Bysk, Sandia, 79-0470, Report 6/1979.
Searcy, Sandia, 80-2341, Report 2/1981.

Primary Examiner—Brian E. Hearn
Assistant Examiner—Stephen J. Kalafut
Attorney, Agent, or Firm—Armand McMillan; James H. Chafin; Judson R. Hightower

[57] ABSTRACT

In a method for preparing lithiated, particulate FeS$_2$ useful as a catholyte material in a lithium thermal battery, whereby the latter's voltage regulation properties are improved, comprising admixing FeS$_2$ and an amount of a lithium-containing compound whereby the resultant total composition falls in an invariant region of the metallurgical phase diagram of its constituent components, an improvement comprises admixing said lithium-containing compound and FeS$_2$ together with a solid electrolyte compatible with said catholyte, and heating the mixture at a temperature above the melting point of said electrolyte and at which said mixture reaches its thermodynamic equilibrium number of phases.

17 Claims, 6 Drawing Figures

UNREACTED MULTIPHASE COMPONENTS IN CATHODE

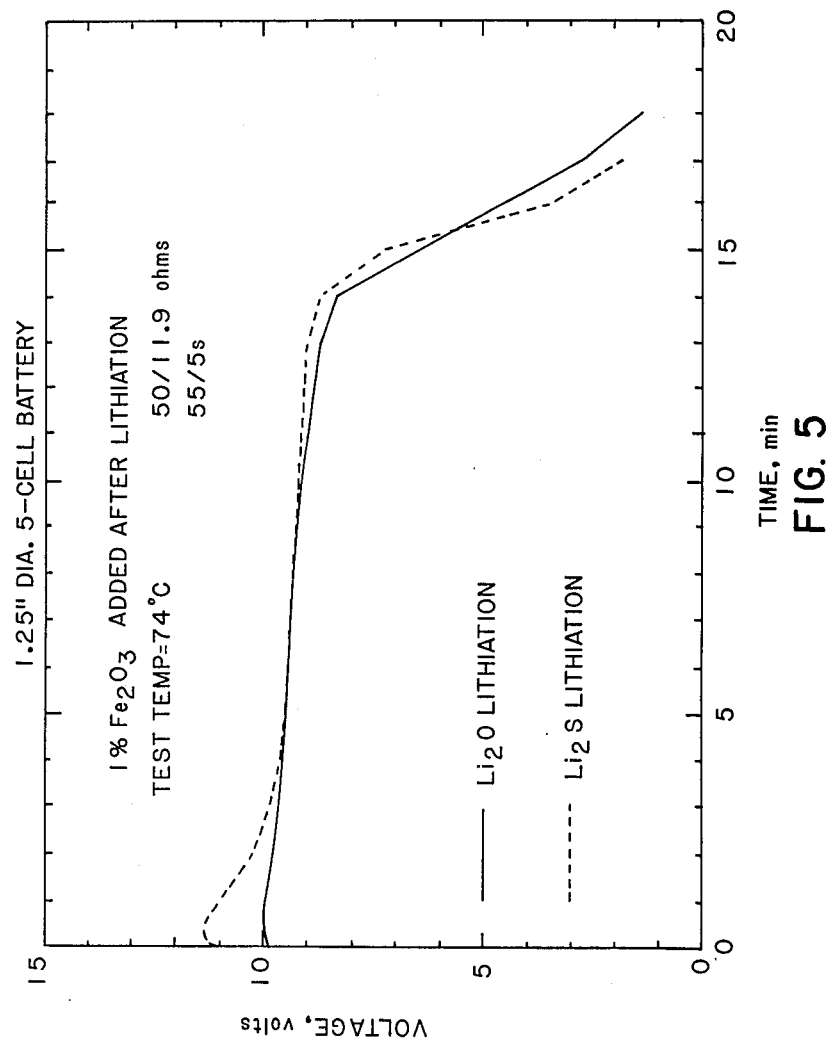

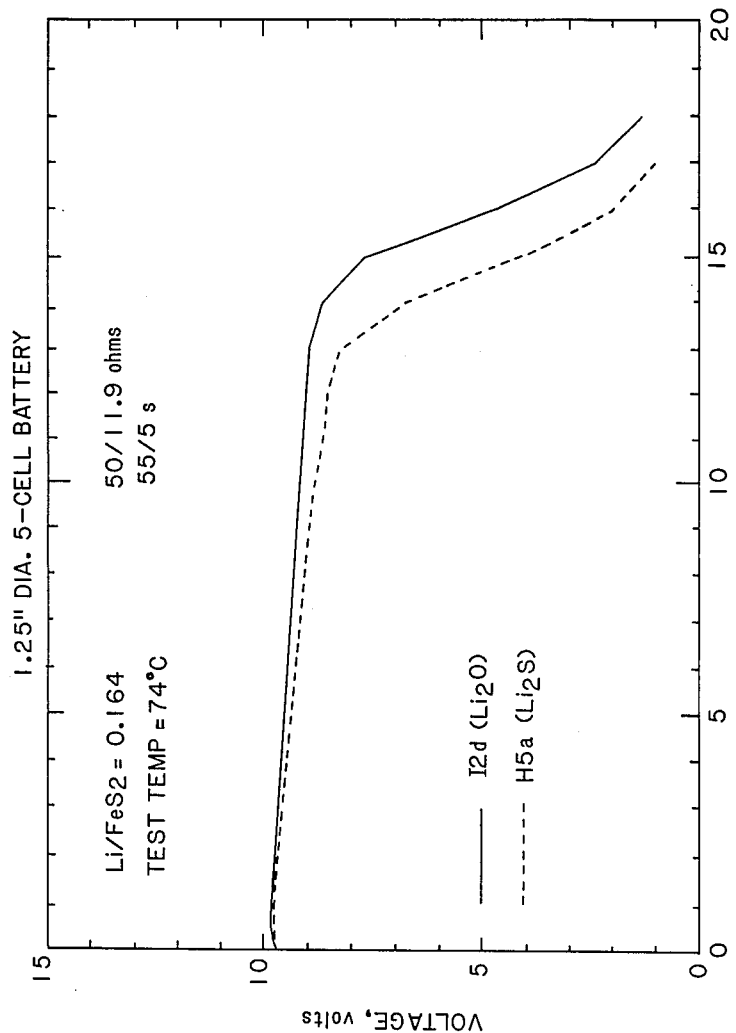

1

METHODS FOR ACHIEVING THE EQUILIBRIUM NUMBER OF PHASES IN MIXTURES SUITABLE FOR USE IN BATTERY ELECTRODES, E.G., FOR LITHIATING FES$_2$

The U.S. Government has rights in this invention pursuant to Contract No DE-AC04-76DP00789 between the U.S. Department of Energy and AT & T Technologies, Inc.

BACKGROUND OF THE INVENTION

This invention relates to improved methods for achieving the equilibrium number of phases in multicomponent compositions which are useful as catholyte or anolyte materials in batteries. Particularly, it relates to an improved method of lithiating FeS$_2$ and achieving the equilibrium number of phases in the resultant composition.

Many batteries are known to have undesirable voltage irregularities, e.g., voltage transients ("spikes") occuring upon battery initiation or during battery discharge, voltage fall-off, particularly at the end of a battery's useful life, irreproducibility, etc. Many attempts have been made to improve or eliminate such irregularities.

In commonly assigned patent application Ser. No. 872,718 to Godshall, filed on even date, a very effective solution to this problem is disclosed. It involves using as the anolyte or catholyte composition, one which is in, or which upon battery initiation immediately reaches its equilibrium number of phases and which falls in an invariant (degrees of freedom=0) region of the corresponding metallurgical phase diagram. For the lithium thermal battery, this principle is embodied in the lithiation of the conventional FeS$_2$ cathode material whereby the prior art catholyte falling into a variable region of the Li/Fe/S phase diagram is replaced by lithiated FeS$_2$ containing sufficient lithium that it falls in the desired invariant region.

In the mentioned copending application, whose entire contents are incorporated by reference herein, methods are described for carrying out the necessary attainment of the equilibrium number of phases and for modifying the conventional battery materials to prepare compositions falling in the necessary invariant region of the corresponding phase diagram. However, these methods are burdensome, involve difficult to handle materials, necessitate a separate mixing step with the electrolyte-binder mix required to prepare the final catholyte, produced final mixtures which have undesirable storage properties, e.g., exhibit settling behavior causing inhomogeneities, etc. Accordingly, there is a need for an improved method of applying the principles of the mentioned prior art disclosure, particularly, to the lithium thermal battery case.

SUMMARY OF THE INVENTION

Accordingly, it is an object of this invention to eliminate or ameliorate the mentioned difficulties.

Upon further study of the specification and appended claims, further objects and advantages of this invention will become apparent to those skilled in the art.

These objects have been achieved, in one aspect, by providing in a method for preparing lithiated, particulate FeS$_2$ useful as a catholyte material in a lithium thermal battery, whereby the latter's voltage regulation properties are improved, comprising admixing FeS$_2$ and an amount of a lithium-containing compound whereby the resultant total composition falls in an invariant region of the metallurgical phase diagram of its constituent components, the improvement comprising admixing said lithium-containing compound and FeS$_2$ together with a solid electrolyte compatible with said catholyte, and heating the mixture at a temperature above the melting point of said electrolyte and at which said mixture reaches its thermodynamic equilibrium number of phases.

In preferred aspects, the mixture prior to fusion further comprises an inert binder which preferably is added to the other components together with the electrolyte in combined form. In other preferred aspects, the lithium-containing compound is added in the form of Li$_2$S, a lithium alloy, e.g., Li(Si) or Li(Al), Li$_2$O or Li$_2$O$_3$. Typically, the amount of lithium compound is sufficient to achieve a lithium/FeS$_2$ molar ratio in the range of about 0.05 to about 0.20; however, larger amounts can be used if the corresponding decrease in battery capacity is tolerable or desirable.

In another aspect, this invention relates to the lithiated FeS$_2$ material prepared by the mentioned process. It also relates to the corresponding improved lithium thermal batteries which result upon using the lithiated FeS$_2$ material of this invention to form the cathode.

In yet another aspect, this invention provides, in a method for preparing an anolyte or catholyte material useful in a battery to improve its voltage regulation properties, comprising preparing said material such that its total composition falls in an invariant region of the metallurgical phase diagram of its constituent components, the improvement comprising preparing said material by admixing its constituent components and a solid, battery-compatible material which melts at temperature T, and heating said total mixture at a temperature equal to or above temperature T at which the mixture reaches its thermodynamic equilibrium number of phases.

DETAILED DISCUSSION

All of the methods of this invention, when applied to the lithiation of FeS$_2$, enable the production of corresponding lithium thermal batteries wherein the bothersome initial voltage transient ("spike") is eliminated and other voltage irregularities discussed in the mentioned copending application and also discussed below are eliminated or ameliorated. In the mentioned Godshall patent application, the lithiation was achieved by grinding Li$_2$S with FeS$_2$ and FeS a number of times. After each grinding, the material was reacted at elevated temperatures overnight. Subsequently, in a separate step, the resultant lithiated mixture was blended with a conventional electrolyte-binder mix comprising fumed SiO$_2$ and LiCl—KCl eutectic. Using the procedure of this invention, it has surprisingly been discovered that the corresponding lithiated FeS$_2$ not only can be more simply prepared in a single step process but also that the resultant materials have properties which are superior.

In accordance with this invention, the lithium-containing material used to effect the lithiation is simply mixed with the necessary amount of FeS$_2$ (and FeS, if desired, in the case of Li$_2$S), along with the desired amounts of electrolyte and binder or of electrolyte-binder mix. The mixture is then fused at a temperature greater than that of the melting point of the electrolyte but less than that at which any of the components, e.g., $FeS_2$, might be adversely effected, e.g., $FeS_2$ experiences unacceptable thermal decomposition at about 500° C.

The conditions for the fusing step are chosen such that the necessary thermodynamic equilibrium number of phases is achieved upon reaction of the admixed components. In this regard, the lithiating material will be chosen to have a negative Gibbs free energy such that the necessary chemical reaction will always be effected.

In addition, the conditions are chosen that the mentioned melting of the electrolyte occurs. This is an important feature of this invention as it produces a uniform distribution of electrolyte on the $FeS_2$-based particle surfaces, throughout the catholyte. As a result of this fluxing-type effect, the prior art tendency of particle segregation upon storage of the material is eliminated or significantly reduced. Thus, during the fusion operation, the catholyte particles, e.g., $FeS_2$ particles become coated with the electrolyte. This produces better particle-particle contact when the catholyte powder subsequently is compressed into pellets according to conventional procedures. This reduces polarization and increases the current capability of the catholyte as discussed subsequently. In addition, where the lithiation agent is soluble in the electrolyte, as it is in LiCl—KCl eutectic, the reaction is facilitated.

In addition, although the fusion step has no significant effect upon the initial voltage spike which is eliminated merely by selecting the correct lithiation composition, it does improve the end-of-life performance of the batteries of this invention when compared with the corresponding batteries which are not subjected to a fusion step prior to initiation of the battery.

Another advantage of fusing the catholyte mix is a resultant preaging of the material in effect. As a result, the heretofore observed variability in catholyte performance often resulting from the prolonged storage of a battery, is eliminated or greatly ameliorated. This has been shown using the procedures of Searcy et al, "Aging Study of Li(Si)/$FeS_2$ Thermally Activated Batteries," SAND 80-0423 (Albuquerque, NM: Sandia National Laboratories, May 1980), which disclosure is entirely incorporated by reference herein. In this technique, decomposition of $FeS_2$ is generally taken as the critical chemical reaction for determination of experimental conditions for the accelerated aging tests. Using these methods, catholyte mixes prepared in accordance with this invention at 400° C. for 8 hours in an inert gas produce materials exceeding many times the storage requirements of 25 years at 75° C. Overall, the fused material of this invention is significantly more reliable than prior art counterparts.

The mixing step is conducted entirely conventionally and the details are not critical. The materials can be added to one another in any order, at any speed and with or without agitation. A homogeneous premix is preferred.

The mix, of course, will contain the conventional $FeS_2$ material used to prepare conventional catholytes and will contain the lithium-containing compound. In addition, it is essential to include a component which is liquid at the fusion temperature. Typically, this will be a solid material at room temperature and is most conveniently and preferably provided by the electrolyte component conventionally utilized in anodes or cathodes such as in conventional lithium thermal battery catholytes. The electrolyte can be added to the admixture alone or, preferably, in combination with a conventional binder used to improve the cohesiveness of the resultant cathode or anode. Such electrolyte binder mixes are fully conventional and are discussed in the literature, e.g., in Baldwin, "Characteristics and Development Report for the MC3077 Thermal Battery," SAND 83-0863 (August 1984), and Bush, "The Li/-$FeS_2$ System for Thermal Batteries," SAND 79-0470 (July 1979), both of whose contents are entirely incorporated by reference herein. It is also possible to add the binder separately to the admixture. In general, the electrolyte-binder mix comprises about 30-40% of binder and, correspondingly, about 70-60% of electrolyte. However, these ranges can be significantly broadened depending upon the particular details involved. For example, due to its high adsorbance, fumed $SiO_2$ binders are useful in significantly smaller amounts, e.g., 8-15%.

In general, the identity of the electrolyte and/or the binder and the total amounts used are not especially critical. These are chosen in accordance with conventional considerations relating to the battery design and environmental conditions to which the battery will be subjected. Typical electrolytes include eutectics of lithium chloride-potassium chloride or other analogous halide eutectics of other alkali metals, e.g., rubidium and cesium chlorides or bromides, etc. Typically, the identity of the electrolyte will be chosen in accordance with the desired temperature for the fusion step and conventional consideration of battery design. Electrolytes of lower melting points enable the fusion step to correspondingly be carried out at lower temperatures. However, neither the identity of the electrolyte nor the corresponding operating temperature will be critical as long as the electrolyte is compatible with normal battery considerations and the temperature results in the described particle coating phenomenon and its resultant advantages.

Similarly, the identity of the binder is not critical as long as it is compatible with the other mixture components, e.g., it does not react with any of the other components under fusion conditions. Of course, it also must be capable of immobilizing the molten electrolyte to prevent leakage and preferably serves as an effective binder of the $FeS_2$ particles. A particularly preferred binder is magnesium oxide since it forms the basis for the separator elements in lithium batteries. However, many other typical binders are useful, including the usual inorganic binders, e.g., $SiO_2$, $Al_2O_3$, CaO, yttrium oxide, etc.

Also, non-critical to this invention is the particle size of the various materials. Typically, the smaller the particle size, the greater will be the current density of the resultant battery and the faster will be the reaction speed during fusion because of the increased surface area. As a result, in general, the finer the particle size, the better. For $FeS_2$, which in essence determines the particle size in the final product, a powder of −425 mesh has been found to be especially useful. However, finer or coarser materials can also be utilized, e.g., material as coarse as −230+325 is quite satisfactory.

The amount of electrolyte, binder or combination thereof is similarly non-critical as long as there is provided sufficient liquid under the fusion conditions to achieve the desired particle coating by the melted electrolyte and sufficient binder to achieve the desired degree of immobilization of the electrolyte-coated particles. Where a more fluid catholyte is desired, corresponding less binder will be utilized. Typically, for electrolyte-binder mixes of the above-mentioned relative composition, 20–40% with respect to the amount of $FeS_2$ will be satisfactory. Most typically, about 20–35% of the electrolyte-binder mix is utilized based on $FeS_2$, most preferably about 25%.

The fusion step itself is carried out at a temperature equal to or greater than the melting point of the component which provides the liquid during the fusion step, e.g., the electrolyte, but less than a temperature at which any of the components of the mixture is adversely affected, e.g., decomposes. For the lithiation of $FeS_2$, the temperature will be greater than the melting point of the electrolyte, e.g., 352° C. for the LiCl—KCl eutectic preferred, but will be less than 500° C., the temperature above which thermal decomposition of $FeS_2$ becomes appreciable. Typically, the fusion step will be carried out at 375°–475° C., more preferably, 375°–425° C., and most preferably at about 400° C.

The duration of the fusion step will be at least the time required to carry out the necessary thermodynamic equilibration of the admixture, but most preferably will also be sufficient to achieve an optimized uniform coating of the mixture particles by the fused liquid. Typically, 1–16 hours will be sufficient, most preferably 2–16 hours, especially preferably 6–10 hours, and most especially about 8 hours. Moderate mixing or tumbling of the fused mixture can optionally be employed to enhance homogeneity. However, for the system of the examples, capillary action is sufficient to ensure the desired homogeneity.

The fusion step, of course, will be carried on under inert conditions. Typically, an inert gas atmosphere will be provided using, e.g., nitrogen, argon, helium, etc. Atmospheres of the normal purity will suffice, e.g., 99.9% pure or, preferably, 99.999% pure. In addition, the fusion will be carried out in reaction trays which are inert under the reaction conditions, e.g., $Al_2O_3$, $SiO_2$, stainless steel, etc.

All materials used in the method of this invention will be of conventional purity as necessary for the particular battery system involved. Purity of materials typically is not critical for battery performance. For example, 95% pure $FeS_2$ is commonly used.

As to the relative amounts of the active ingredients, these will be determined by the metallurgical phase diagram in accordance with the principles described in detail in the copending Godshall application incorporated above. Precise relative amounts can be routinely determined emperically by routine orientating experiments. For example, for the lithiation of $FeS_2$, it has been found that the molar ratio of lithium to $FeS_2$ often must be at least 0.05 and preferably is about 0.15. However, these values, especially the lower limit, will vary in accordance with the particular lithiating compound utilized and, correspondingly, the particular resultant metallurgical phase diagram which applies. See the discussion below for $Li_2O$ wherein a higher lower limit has been found.

Theoretically, the upper limit on the lithium/$FeS_2$ ratio is determined by the point in the metallurgical phase diagram at which the voltage drops to 0. This means that the maximum amount of lithium which will be incorporated will be that which ensures that the necessary battery capacity is obtained. Thus, although ratios as high as 2–4 are theoretically possible, much lower ratios are used in order to maximize capacity, e.g., values in the range of 0.05–0.2.

After preparation of the fused mixtures of this invention, post-treatments and incorporation into the battery are conducted in accordance with fully conventional procedures well-known to those of skill in the art. For example, prior to fabrication of the electrodes, the admixture is usually passed through a sieve (typically 60 mesh) and then pelletized. For details of these and other post-treatments of the mixture, as well as other relevant details relating to the lithium thermal battery system, all of which are as conventional unless indicated otherwise herein, see the references incorporated above and also Searcy, et al SAND 80-2341 (February 1981), which also is incorporated by reference herein entirely. For example, any method known to improve uniformity, especially in conjunction with achievement of the equilibrium number of phases of a composition, e.g., grinding, can be utilized in conjunction with this invention.

Although this disclosure is written primarily in terms of the most-studied system, i.e., the lithium thermal battery system, it is also applicable to the preparation of anolytes or catholytes which improve the voltage regulation properties of other battery systems in accordance with the copending Godshall application mentioned above. In this regard, see also Aselage et al, "Multicomponent Phase Diagrams for Battery Applications: I Phase Diagram and Trajectory Calculations," SAND 85-1750 (1986), which is incorporated by reference herein and filed herewith as part of this application.

Essentially any lithium-containing compound having a negative free energy for the reaction with $FeS_2$ can be utilized in accordance with this invention. One such compound is $Li_2S$. It is utilized fully in accordance with the foregoing disclosure. The minimum molar ratio of lithium to $FeS_2$ for lithiation by $Li_2S$ has been found to be about 0.05 to ensure optimum initial spike elimination. Typically, values of about 0.16 are preferred in order not to inordinately reduce the capacity of the resultant battery.

Another typical lithiating reagent is an alloy of lithium and silicon Li(Si). This is preferred especially for those batteries which use a Li(Si) anode. Since the reaction with lithium metal is highly exothermic, heat management during the reaction must be exercised. Thus, it is preferred to operate at the lower end of the mentioned temperature range, typically the preferred upper limit being about 400° C. Similarly, larger particle sizes can be employed to minimize surface area thereby slowing down the reaction and concomitant heat evolution. However, it generally is preferred to use other methods for heat management since finer particle sizes are preferred in general to maximize current density and maintain high reaction speed.

The ratio of lithium to its alloy partner is not especially critical. Too large a proportion of the partner will produce catholytes having needlessly high amounts of the non-electrochemically active species. Too high amounts of lithium may produce a reaction too difficult to heat manage efficiently. Typically, amounts in the range of about 25–45% lithium will be useful, most preferably about 35–40% lithium. In addition to silicon and aluminum alloying partners, many other metals producing alloys which are solid under the fusion conditions can be utilized. Both binary and ternary alloys can be used, e.g., Li(Ge) or Li(Si)(Al).

Lithium oxide is a preferred lithiating compound in accordance with this invention. The resultant compositional system is a quaternary one, the element oxygen in addition being included. As a result, the lowest ratio of lithium to iron disulfide which ensures that the necessary invariant region of the phase diagram is reached is somewhat different for this system. The lower molar ratio ensuring elimination of the initial voltage spike has been found to be about 0.08. Again, values of this ratio of about 0.15 are preferred. For a full discussion of the phase diagram and battery considerations for this system, see Aselage et al, "Multicomponent Phase Diagram for Battery Applications: II Oxygen Impurities in the Li(Si)/FeS$_2$ Battery Cathode", SAND 85 1751 (1986), which is entirely incorporated by reference herein and filed herewith as part of this application.

As discussed further below, an additional advantage of this Li$_2$O system is that the storability of the resultant mix is significantly enhanced. The production of oxidized products upon storage leads to a return of the voltage irregularities in catholytes produced in accordance with this invention using other lithiating compounds. Thus, the resultant Li$_2$O-based catholyte is more tolerant to storage conditions or mishandling.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

EXAMPLE 1

127 g (63.5%) of FeS$_2$ was blended with 50 g (25%) of electrolyte-binder mix (88% LiCl-KCl eutectic and 12% Cab-O-Sil EH-5 fumed SiO$_2$), 15 g (7.5%) of FeS, and 8 g (4%) of Li$_2$S. The mixture was then heated in an inert (e.g., Al$_2$O$_3$) tray at 400° C. for 8 hours in a high-purity, inert-gas atmosphere (e.g., Ar). The resulting mix was then passed through a sieve (typically 60 mesh) and pelletized.

A representative 5-cell-battery discharge curve for the Li$_2$S-lithiated mix is shown in FIG. 1, along with the corresponding curve for the unlithiated mix. The voltage for the lithiated mix was better regulated and exhibited no transients.

The preferred particle size of the FeS$_2$ is $-425$ mesh, although material as course as $-230+325$ mesh was also suitable. (Normally, the $-425$ mesh fraction of FeS$_2$ is discarded during preparation of $-325+425$ mesh FeS$_2$, which is the particle size used for thin-cell Li(Si)/FeS$_2$ applications. This particular particle size can have a grinding yield as low as 20%. By using the $-425$ mesh fraction, essentially 100% utilization of the FeS$_2$ feed material can be realized. A second advantage of using a finer particle size of FeS$_2$ is an increased current-carrying capability because of the higher surface area.)

The degree of lithiation of this example corresponds to a Li/FeS$_2$ mole ratio of 0.280. Li/FeS$_2$ ratios as low as 0.05 also provided adequate voltage regulation and suppression of the initial voltage spike. The preferred Li/FeS$_2$ mole ratio is 0.16.

The added-FeS content of the mix can be reduced to zero when the FeS$_2$ already contains FeS as an impurity, as is often the case.

EXAMPLE 2

Figure 2:
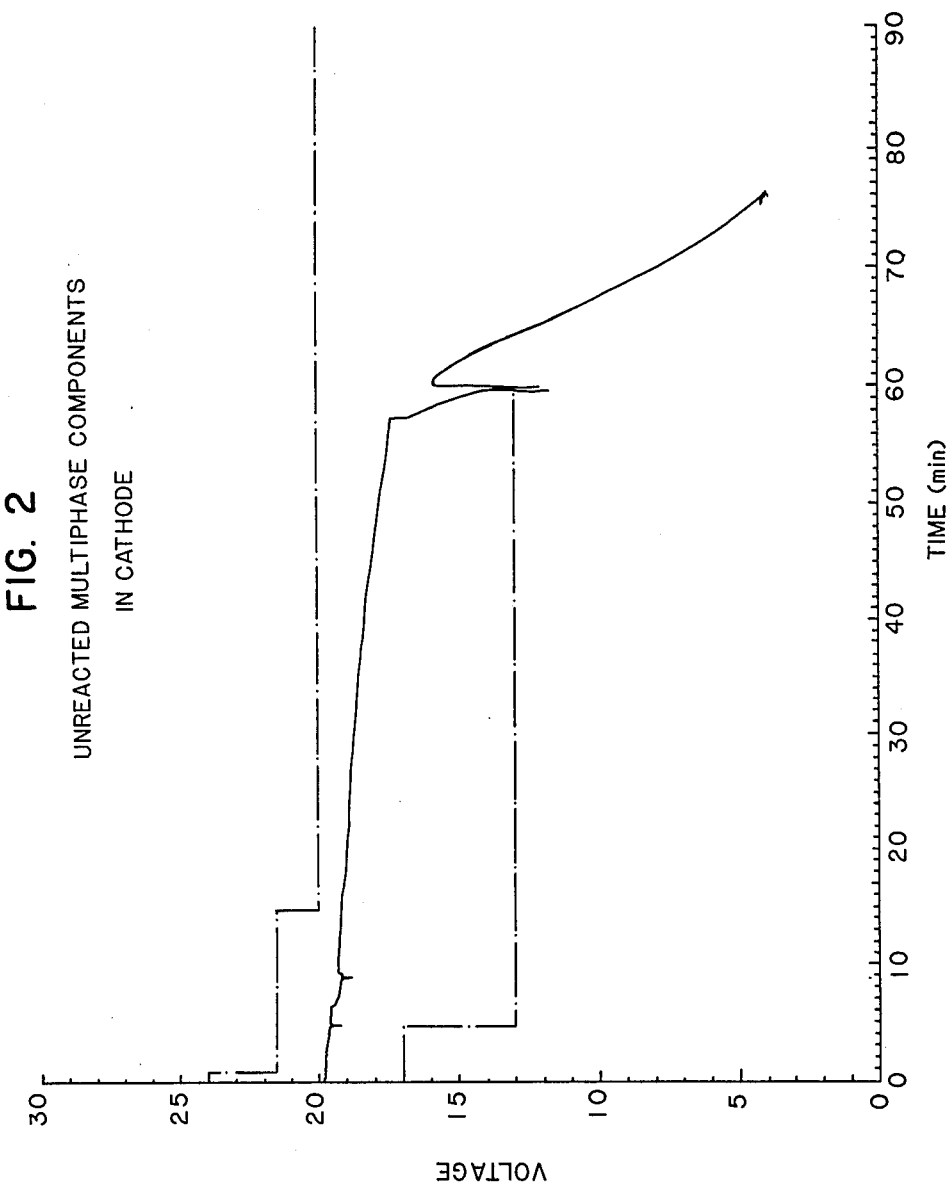

The catholyte mix of Example 1 was prepared but not heated at all. The voltage spike was still removed. However, for long-life (e.g., 60 min. or more) applications, the performance was adversely affected near the end of life. This is evident in FIG. 2 for the disharge of an 3815 (Sandia Laboratories' designation) thermal battery with an unheated lithiated catholyte mix. The battery failed the pulse at 60 min. even though the initial voltage spike was removed.

EXAMPLE 3

While lithiation of FeS$_2$ by Li$_2$S is effective in removing the voltage spike, Li$_2$S has the disadvantage of being noxious to handle, producing H$_2$S upon contact with water vapor—even in a dry room. Substantial amounts of this toxic gas are also evolved during the fusion step, as a result of the same reaction with moisture in the electrolyte-binder mix.

An alternate method of spike removal involves the addition of Li-alloy powder, such as Li(Si), to a mixture of electrolyte-binder powder and FeS$_2$.

159 g of FeS$_2$ (74.5%) was blended with 49 g (24.5%) of electrolyte-binder mix (65% LiCl-KCl eutectic and 35% Merck Maglite S MgO) and 2 g (1.0%) of $-230+325$ mesh Li(Si) alloy containing 44% Li. The mixture was then heated in an Al$_2$O$_3$ or stainless steel tray at 400° C. for 8 hours under high-purity inert gas. The resulting mix was then passed through a sieve (typically, 60 mesh) and pelletized.

A 5-cell-battery discharge curve for the Li(Si) lithiated mix showed that the Li(Si) additive was effective in removing the initial voltage spike.

The electrolyte-binder mix used in Example 1 could not be used for the mix of this example, as the Li(Si) alloy will react with the SiO$_2$. The MgO-based electrolyte-binder mix, in contrast, is thermodynamically stable towards the Li(Si) alloy.

The degree of lithiation in this Example corresponds to a Li/FeS$_2$ mole ratio of 0.10, which is the preferred ratio. Ratios as low as 0.05 and as high as 0.26 provided adequate voltage regulation and capacity. Since the reaction of Li(Si) with the FeS$_2$ is exothermic, lithiation to a high Li/FeS$_2$ ratio (e.g., >0.2) can lead to temperatures over 450° C. in the catholyte. This is not desirable, as decomposition of FeS$_2$ can occur at temperatures above 500° C. Thermal management by conventional procedures poses no problem, however, if the Li/FeS$_2$ mole ratio is maintained at <0.15.

The particle size of the Li(Si) alloy used was $-230+325$ mesh. Material as coarse as $-40+230$ mesh or as fine as $-325$ mesh also worked well. The finer material is preferred, for increased reaction rates.

The Li content of the Li(Si) alloy is not critical for proper lithiation. Lithiation of FeS$_2$ with 35% Li-Si alloy was equally effective as 44% Li-Si, as long as the same Li/FeS$_2$ mole ratio was used. Other Li alloys can also be used. Lithiation with $-325$ mesh 20% Li-Al alloy was suitable.

In the lithiation of FeS$_2$ with Li-alloys, the Li in the alloy chemically reacts with the FeS$_2$ to form Li$_x$Fe$_2$S$_4$ upon melting of the electrolyte, wherein x is the degree of lithiation. The molten electrolyte serves as a conductive medium for Li$^+$ transport, so that the FeS$_2$ is, in essence, internally (to the catholyte) discharged during the fusion step. At the same time, any oxides or other oxidized forms of Fe (e.g., sulfate), present as impurities, are also reduced.

The end result of fusion of Li(Si) with the FeS$_2$-electrolyte binder mixture is that the catholyte is predischarged past the voltage-spike region normally present at the start of discharge. This is equivalent to electrochemically discharging Li(Si)/FeS$_2$ single cells but without the disadvantages, such as dimensional changes in the pellets.

EXAMPLE 4

147 g of FeS$_2$ (73.5%) was blended with 50 g (25%) of electrolyte-binder mix (65% LiCl-KCl eutectic and 35% Merck Maglite S MgO) and 3 g (1.5%) of Li$_2$O (typically, $-200$ mesh). The mixture was then heated in an Al$_2$O$_3$ or stainless steel tray at 400° C. for 8 hours under high-purity inert gas. The resulting mix was then passed through a sieve (typically, 60 mesh) and pelletized.

A 5-cell-battery discharge curve for the Li$_2$O-lithiated mix showed that the voltage for the lithiated mix exhibited no transients.

Figure 3:
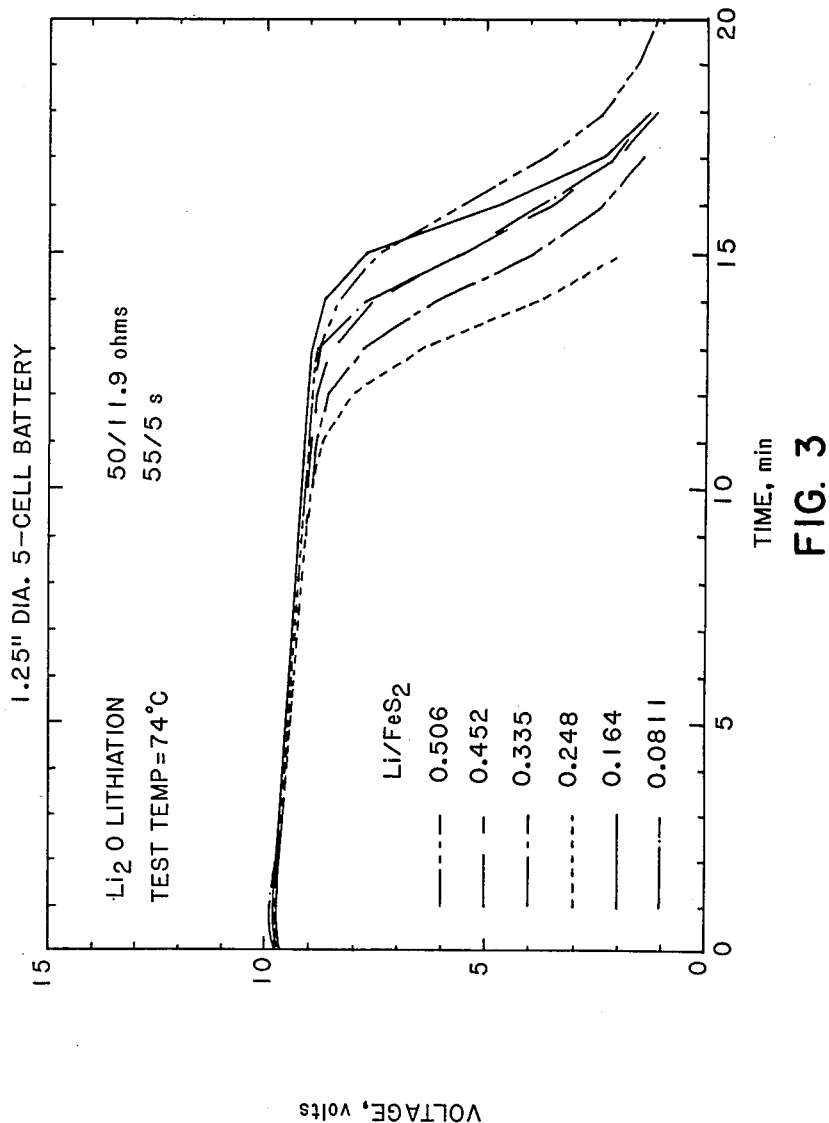

The voltage spike was effectively removed using a mole ratio of Li/FeS$_2$ from 0.08 to over 0.50 (See FIG. 3). A ratio of 0.15 is preferred.

Figure 4:
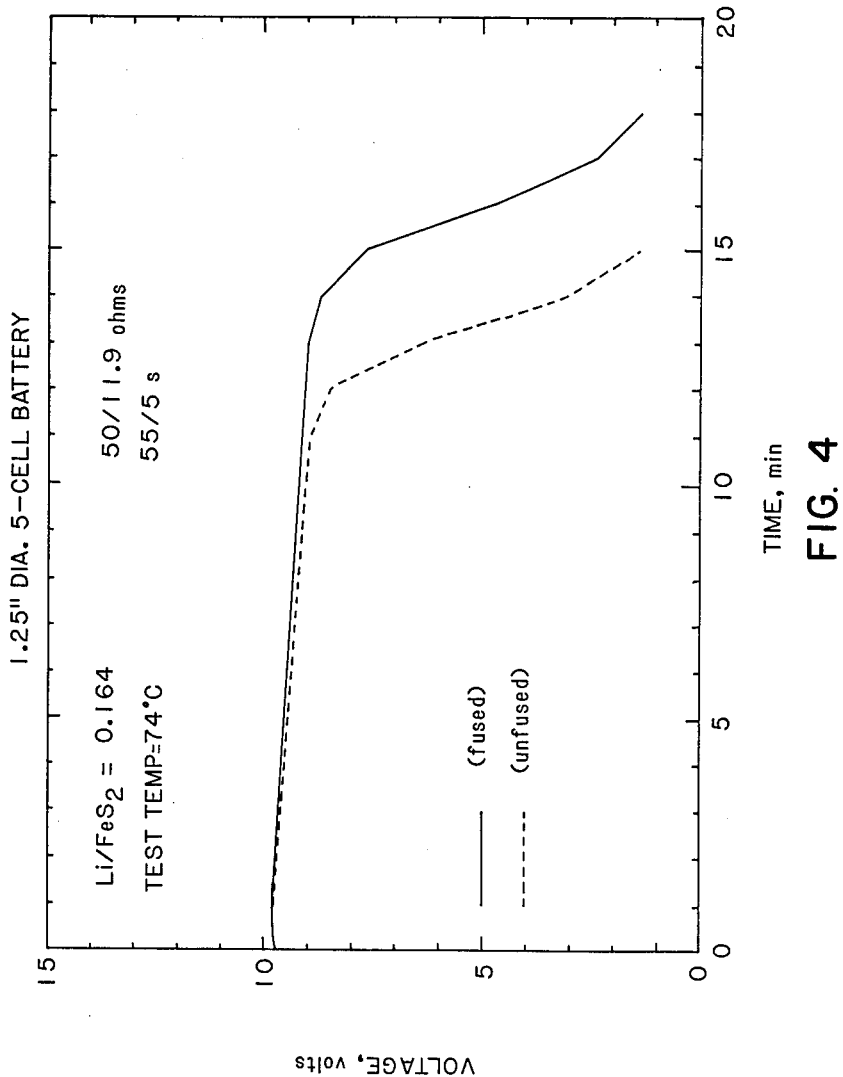

Heating times of 2 to 16 hours can be used, with 8 hours being preferred. Even if the mix was not heated, the voltage spike is still removed. However, there was some reduction in the active life of the battery (FIG. 4).

This technique has several advantages over lithiation with Li$_2$S or Li(Si). Li$_2$O is not noxious to handle (like Li$_2$S) and not extremely moisture or air sensitive (like Li(Si)). The lithiation process is not exothermic as when Li(Si) is used. In addition, the use of Li$_2$O allows the catholyte mix to tolerate post-lithation oxidation; i.e., oxidation of the catholyte after having been lithiated. This results in the formation of oxidized Fe compounds in the catholyte, with the concomitant return of the voltage spike.

The results of simulated post-oxidation tests are shown in FIG. 5 for 5-cell batteries built with catholytes lithiated with Li$_2$O and Li$_2$S, in which 1% Fe$_2$O$_3$ was added after lithiation. The mix formulated with Li$_2$O was able to tolerate the added oxide without exhibiting a voltage spike after activation. In contrast, the catholyte formulated with Li$_2$S plus added oxide showed a large voltage spike. This same behavior was found for the Li(Si)-lithiated mix, as well, when 1% Fe$_2$O$_3$ was added after lithiation.

The catholyte mix formulated with Li$_2$O shows less polarization than the corresponding Li$_2$S counterpart (i.e., same Li/FeS$_2$ mole ratio). This is shown in FIG. 6 for 5-cell battery tests, where the cell voltage for the Li$_2$O-lithiated mix is noticeably higher than that for the Li$_2$S-lithiated catholyte.

EXAMPLE 5

A fourth lithiation agent which showed promise is Li$_2$CO$_3$. This can be considered a variation of the use of Li$_2$O, in that carbonate is removed as CO$_2$ during the fusion process.

143.8 g of FeS$_2$ (71.5%) was blended with 50 g (24.9%) of electrolyte-binder mix (65% Li-KCl eutectic and 35% Merck Maglite S MgO) and 7.25 g (3.6%) of Li$_2$CO$_3$ (typically, $-200$ mesh). The mixture was then heated in an Al$_2$O$_3$ or stainless steel tray at 400° C. for 8 hours under high-purity inert gas. The resulting mix was then passed through a sieve (typically, 60 mesh) and pelletized.

The variations in formulations described in Examples 1-4 apply for the use of Li$_2$CO$_3$ for lithiation, as well.

Discharge traces for a 5-cell battery using the Li$_2$CO$_3$-lithiated catholyte mix, showed that while effective in removal of the voltage spike, the Li$_2$CO$_3$ lithiation agent did reduce the active life of the battery relative to when Li$_2$O was used.

EXAMPLE 6

A sample calculation pertaining to the use of Li$_2$O to lithiate FeS$_2$, shows the effect on capacity, of the amount of Li, i.e., increasing x in Li$_x$FeS$_2$ decreases the amount of energy which can be extracted. Thus, the degree of lithiation should be kept to a minimum while still maintaining an essentially flat discharge profile.

TABLE

Composition of Li$_2$O-Lithiated Catholyte Before and After Fusion
Assumed starting composition:
 73.13% FeS$_2$, 24.88% electrolyte/catholyte mix, 1.49% Li$_2$O, 0.5% Fe$_2$O$_3$ (dilution of conventional mix with 0.5% Fe$_2$O$_3$)
Reactions during fusion (lithiation):
 Li$_2$O + 5Fe$_2$O$_3$ → 2LiFe$_5$O$_8$
 48Li$_2$O + 55FeS$_2$ → LiFe$_5$O$_8$ + 25Li$_3$Fe$_2$S$_4$ + 10Li$_2$SO$_4$
Reaction during discharge:
 FeS$_2$ + 1.5Li$^+$ + 1.5e$^-$ → 0.5Li$_3$Fe$_2$S$_4$

| Component | Moles Before | Moles After | |
|---|---|---|---|
| Li$_2$O | 0.0499 | 0 | |
| Fe$_2$O$_3$ | 0.0031 | 0 | |
| LiFe$_5$O$_8$ | 0 | 0.00227 | |
| Li$_2$SO$_4$ | 0 | 0.0103 | |
| Li$_3$Fe$_2$S$_4$ | 0 | 0.0257 | |
| FeS$_2$ | 0.610 | 0.554 | |
| (Coulombs: | 8.82 × 10$^4$ | 8.01 × 10$^4$) | (90.8%) |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a method for preparing lithiated, particulate FeS$_2$ useful as a catholyte material in a lithium thermal battery, whereby the latter's voltage regulation properties are improved, comprising admixing FeS$_2$ and an amount of a lithium-containing compound whereby the resultant total composition falls in an invariant region of the metallurgical phase diagram of its constituent components,
   the improvement comprising admixing said lithium-containing compound and FeS$_2$ together with a solid electrolyte compatible with said catholyte, and heating the mixture in an inert atmosphere at a temperature above the melting point of said electrolyte and at which said mixture reaches its thermodynamic equilibrium number of phases.

2. A method of claim 1, wherein the mixture further comprises an inert binder effective to immobilize the electrolyte when molten.

3. A method of claim 2, wherein the electrolyte and the inert binder are added to the mixture in combined form.

4. A method of claim 2, wherein the lithium-containing compound is $Li_2S$ in an amount sufficient to achieve a $Li/FeS_2$ molar ratio of about 0.1–0.15.

5. A method of claim 4, wherein said heating step is carried out at 375°–425° C. for 6–10 hours.

6. A method of claim 3, wherein the amount of electrolyte binder combination is 20–40 wt % of the total mixture.

7. A method of claim 6, wherein the electrolyte-binder mix consists essentially of 60–70% of LiCl-KCl eutectic and 40–30 wt% MgO binder.

8. A method of claim 2, wherein the lithium-containing compound is a lithium alloy in an amount sufficient to achieve a $Li/FeS_2$ molar ratio of about 0.1–0.15.

9. A method of claim 8, wherein said heating step is carried out at 375°–400° C. for 6–10 hours.

10. A method of claim 8, wherein the amount of electrolyte binder combination is 20–40 wt % of the total mixture.

11. A method of claim 6, wherein the electrolyte-binder mix consists essentially of 60–70 wt% of LiCl-KCl eutectic and 40–30 wt% binder.

12. A method of claim 9, wherein the alloy is Li(Si) or Li(Al).

13. A method of claim 2, wherein the lithium-containing compound is $Li_2O$ in an amount sufficient to achieve a $Li/FeS_2$ molar ratio of about 0.1–0.15.

14. A method of claim 13, wherein said heating step is carried out at 375°–425° C. for 6–10 hours.

15. A method of claim 13, wherein the amount of electrolyte binder combination is 20–40 wt % of the total mixture.

16. A method of claim 6, wherein the electrolyte-binder mix consists essentially of 60–70 wt% of LiCl-KCl eutectic and 40–30 wt% binder.

17. A method of claim 2, wherein the lithium-containing compound is $Li_2CO_3$ in an amount sufficient to achieve a $Li/FeS_2$ molar ratio of about 0.1–0.15.

* * * * *